(12) United States Patent
Bichler et al.

(10) Patent No.: US 9,434,648 B2
(45) Date of Patent: Sep. 6, 2016

(54) ACCELERATOR COMPOSITION

(75) Inventors: Manfred Bichler, Engelsberg (DE); Christoph Hesse, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 821 days.

(21) Appl. No.: 13/451,059

(22) Filed: Apr. 19, 2012

(65) Prior Publication Data

US 2012/0270970 A1 Oct. 25, 2012

Related U.S. Application Data

(60) Provisional application No. 61/477,765, filed on Apr. 21, 2011.

(51) Int. Cl.

| | | |
|---|---|---|
| *C04B 28/04* | (2006.01) | |
| *C04B 28/14* | (2006.01) | |
| *C04B 40/00* | (2006.01) | |
| *C04B 28/06* | (2006.01) | |
| *C08K 3/34* | (2006.01) | |
| *C04B 14/04* | (2006.01) | |
| *C04B 7/02* | (2006.01) | |
| *C04B 7/32* | (2006.01) | |
| *C04B 14/10* | (2006.01) | |
| *C04B 18/08* | (2006.01) | |
| *C04B 18/14* | (2006.01) | |
| *C04B 22/00* | (2006.01) | |
| *C04B 24/16* | (2006.01) | |
| *C04B 24/26* | (2006.01) | |
| *C04B 103/00* | (2006.01) | |
| *C04B 103/12* | (2006.01) | |

(52) U.S. Cl.
CPC .............. *C04B 28/04* (2013.01); *C04B 7/02* (2013.01); *C04B 7/32* (2013.01); *C04B 14/043* (2013.01); *C04B 14/106* (2013.01); *C04B 14/108* (2013.01); *C04B 18/08* (2013.01); *C04B 18/141* (2013.01); *C04B 18/146* (2013.01); *C04B 22/0013* (2013.01); *C04B 24/163* (2013.01); *C04B 24/2647* (2013.01); *C04B 28/06* (2013.01); *C04B 28/14* (2013.01); *C04B 40/0042* (2013.01); *C08K 3/34* (2013.01); *C04B 2103/0088* (2013.01); *C04B 2103/12* (2013.01); *Y02W 30/92* (2015.05); *Y02W 30/94* (2015.05)

(58) Field of Classification Search
CPC ... C04B 28/04; C04B 28/14; C04B 40/0042; C04B 28/06; C04B 14/043; C04B 24/2647; C04B 24/163; C04B 7/02; C04B 7/32; C04B 14/106; C04B 14/108; C04B 18/08; C04B 18/141; C04B 18/146; C04B 22/0013; C04B 2103/12; C04B 2103/0088; C08K 3/34; Y02W 30/90; Y02W 30/94
USPC .......................................................... 524/5
See application file for complete search history.

(56) References Cited

U.S. PATENT DOCUMENTS

| | | |
|---|---|---|
| 5,332,041 A | 7/1994 | Onan et al. |
| 5,355,954 A | 10/1994 | Onan et al. |
| 5,360,841 A | 11/1994 | Knop et al. |
| 5,413,634 A | 5/1995 | Shawl et al. |
| 5,609,680 A | 3/1997 | Kobayashi et al. |
| 5,709,743 A | 1/1998 | Leture et al. |
| 5,925,184 A | 7/1999 | Hirata et al. |
| 6,170,574 B1 | 1/2001 | Jones |
| 6,832,652 B1 | 12/2004 | Dillenbeck et al. |
| 7,041,167 B2 | 5/2006 | Jiang |
| 7,258,736 B2 | 8/2007 | Oriakhi et al. |
| 7,605,196 B2 | 10/2009 | Schinabeck et al. |
| 7,641,731 B2 | 1/2010 | Chanut et al. |
| 7,772,300 B2 | 8/2010 | Schinabeck et al. |
| 8,349,960 B2 | 1/2013 | Gaeberlein et al. |
| 8,436,072 B2 | 5/2013 | Herth et al. |
| 8,653,186 B2 * | 2/2014 | Nicoleau et al. ............. 524/791 |
| 2002/0129743 A1 | 9/2002 | Frailey et al. |
| 2002/0166479 A1 | 11/2002 | Jiang |
| 2004/0261664 A1 | 12/2004 | Oriakhi et al. |
| 2007/0032550 A1 | 2/2007 | Lewis et al. |
| 2007/0163470 A1 | 7/2007 | Chanut et al. |

(Continued)

FOREIGN PATENT DOCUMENTS

| | | |
|---|---|---|
| CA | 2071051 | 12/1992 |
| CA | 2172004 | 9/1996 |

(Continued)

OTHER PUBLICATIONS

Non-final Office Action for U.S. Appl. No. 13/451,024 relating to U.S. Appl. No. 13/451,059, mailing date Sep. 16, 2013.

(Continued)

*Primary Examiner* — Angela C Scott

(74) *Attorney, Agent, or Firm* — Curatolo Sidoti Co., LPA; Joseph G. Curatolo; Salvatore A. Sidoti

(57) ABSTRACT

A process for producing solid compositions containing calcium silicate hydrate (C—S—H) and a water-soluble comb polymer which is suitable as plasticizer for hydraulic binders, wherein the following process steps are carried out: a) contacting of an aqueous C—S—H-containing suspension with at least one comb polymer, b) optionally setting a suitable solids content of the product from step a) by dilution with water and c) drying of the product from step a) or b). The process products which can be obtained, the use thereof in building material mixtures, in particular, containing cement, the use as grinding aid in the production of cement and corresponding building material mixtures are likewise provided.

22 Claims, No Drawings

(56) References Cited

U.S. PATENT DOCUMENTS

| | | |
|---|---|---|
| 2008/0108732 A1 | 5/2008 | Wieland et al. |
| 2008/0200590 A1 | 8/2008 | Schinabeck et al. |
| 2008/0319217 A1 | 12/2008 | Ingrisch et al. |
| 2009/0054558 A1 | 2/2009 | Wieland et al. |
| 2009/0186964 A1 | 7/2009 | Schinabeck et al. |
| 2010/0190888 A1 | 7/2010 | Gaeberlein et al. |
| 2011/0015301 A1 | 1/2011 | Herth et al. |
| 2011/0160393 A1 | 6/2011 | Sakamoto et al. |
| 2011/0269875 A1 | 11/2011 | Nicoleau et al. |

FOREIGN PATENT DOCUMENTS

| | | |
|---|---|---|
| DE | 35 27 981 A1 | 2/1987 |
| DE | 43 42 407 A1 | 6/1995 |
| DE | 4411797 A1 | 10/1995 |
| DE | 197 24 700 A1 | 12/1998 |
| DE | 10 2004 050 395 A1 | 4/2006 |
| DE | 10 2005 001 101 A1 | 7/2006 |
| DE | 20 2006 016 797 U1 | 2/2007 |
| DE | 10 2005 051 375 A1 | 5/2007 |
| DE | 10 2007 027 470 A1 | 12/2008 |
| EP | 0 403 974 A1 | 12/1990 |
| EP | 0 518 156 A2 | 12/1992 |
| EP | 0 605 257 A1 | 7/1994 |
| EP | 0 637 574 A1 | 2/1995 |
| EP | 1 138 697 A1 | 10/2001 |
| EP | 1 491 516 A2 | 12/2004 |
| EP | 1 655 272 | 5/2006 |
| EP | 1655272 | 5/2006 |
| EP | 2 325 231 A1 | 5/2011 |
| JP | 2000/095554 A | 4/2000 |
| JP | 2008/127247 | 6/2008 |
| WO | 2001/058863 | 3/2001 |
| WO | WO02/070425 A1 | 9/2002 |
| WO | WO 2005/077857 A2 | 8/2005 |
| WO | WO 2005/090424 A1 | 9/2005 |
| WO | WO 2006/002936 A1 | 1/2006 |
| WO | WO 2006/138277 A2 | 12/2006 |
| WO | WO 2007/071361 A1 | 6/2007 |
| WO | WO 2010/026155 A1 | 3/2010 |
| WO | WO 2011/006837 A1 | 1/2011 |
| WO | WO 2011/026720 A1 | 3/2011 |
| WO | WO2011/026720 A1 | 3/2011 |
| WO | WO 2011/026825 A2 | 3/2011 |

OTHER PUBLICATIONS

"Silica"; Ullmann's Encyclopedia of Industrial Chemistry; 2002; Wiley-VCH Verlag GmbH & Co. KGaA; Abstract.
PCT/EP2009/061334—International Search Report, Jan. 25, 2010.
PCT/EP2009/061334—International Written Opinion, Jan. 25, 2010.
PCT/EP2009/061334—International Preliminary Report on Patentability, Mar. 8, 2011.
PCT/EP2010/061762; International Search Report; Dec. 21, 2010.
PCT/EP2010/061762; International Written Opinion, Dec. 21, 2010.
PCT/EP2010/061762; International Preliminary Report on Patentability, Mar. 6, 2012.
PCT/EP2010/061809; International Search Report, Nov. 24, 2010.
PCT/EP2010/061809; International Written Opinion, Nov. 24, 2010.
PCT/EP2010/061809; Internation Preliminary Report on Patentablity, Mar. 6, 2012.
EP 08163468.5; priority document, Sep. 2, 2008.
Cölfen, Helmut; "Analytical Ultracentrifugation of NanoParticles"; Polymer News; 2004; vol. 29; p. 101-116; Taylor & Francis; Abstract.
Saito, Fumio, et al.; "Mechanochemical Synthesis of Hydrated Calcium Silicates by Room Temperature Grinding"; Solid State Ionics; 1997; pp. 37-43; Elsevier.
PCT/EP2011/053349—International Search Report, Jul. 29, 2011.
PCT/EP2011/053349—International Written Opinion, Jul. 29, 2011.
PCT/EP2011/053349—International Preliminary Report on Patentability, Sep. 25, 2012.
PCT/EP2011/070820—International Search Report, Apr. 2, 2012.
PCT/EP2011/070820—International Written Opinion, Apr. 2, 2012.
PCT/EP2011/070820—International Preliminary Report on Patentability, Jun. 4, 2013.
Non Final Office Action for U.S. Appl. No. 13/035,281 mailed Jun. 5, 2013.
Final Office Action for U.S. Appl. No. 13/035,281 mailed Dec. 17, 2013.
Final Office Action for U.S. Appl. No. 13/035,281 mailed Apr. 15, 2014.
Non-Final Office Action for U.S. Appl. No. 13/035,281 mailed Sep. 25, 2014.
Final Office Action for U.S. Appl. No. 13/451,024 mailed Jan. 28, 2014.
Non-Final Office Action for U.S. Appl. No. 13/451,024 mailed Jul. 8, 2014.
Non-Final Office Action for U.S. Appl. No. 13/392,988 mailed Aug. 1, 2014.
Matsuyama, et al., "The Formation of C—S—H/polymer complexes with superplasticizing polymers", Concrete Science and Engineering, pp. 148-156, vol. 1, Sep. 1999, RILEM Publications S.A.R.L.
Markus Arnold Dissertation, "Polymer-Controlled Crystallization of Calcium Hydroxide and Calcium Silicate Hydrate", University of Siegen, pp. 1-180, 2004. ((English language translation of pertinent sections (pp. 113-157, 167-168 and 177-178) are provided)).

* cited by examiner

ACCELERATOR COMPOSITION

This application claims the benefit of the filing date under 35 U.S.C. 119(e) from U.S. Provisional Application For Patent Ser. No. 61/477,765 filed on Apr. 21, 2011.

Provided is a process for producing solid, optionally pulverulent, compositions containing calcium silicate hydrate and a water-soluble comb polymer which is suitable as plasticizer for hydraulic binders, comprising:
a) mixing of an aqueous suspension containing calcium silicate hydrate which is optionally suitable as setting and curing accelerator for (portland) cement-containing binder systems with at least one water-soluble comb polymer which is suitable as plasticizer for hydraulic binders,
b) optionally setting of a suitable solids content of the product from step a) by dilution with water and
c) drying of the product from step a) or b), optionally at temperatures below 150° C.

Provided are compositions which can be obtained from the present process and also the use of the present compositions which can be obtained from the process as curing accelerators in building material mixtures containing (portland) cement, slag sand, fly ash, silica dust, metakaolin, natural pozzolanas, calcined oil shales and/or calcium aluminate cement, optionally essentially (portland) cement as binder. Provided also are processes of using the present solid compositions which can be obtained from the process as grinding aids in the production of cement and in building material mixtures containing the compositions which can be obtained from the process and (portland) cement, slag sand, fly ash, silica dust, metakaolin, natural pozzolanas, calcined oil shales and/or calcium aluminate cement. The processes of using the present compositions as grinding aids in the production of cement may comprise mixing the composition(s) with clinker or clinker blend before or during grinding of the clinker or clinker blend. The processes of using the present composition in building material mixtures may comprise mixing the compositions with (portland) cement, slag sand, fly ash, silica dust, metakaolin, natural pozzolanas, calcined oil shales and/or calcium aluminate cement, and water.

Pulverulent curing accelerators for cement-based building material mixtures which, owing to their solid state, are fundamentally suitable for use in dry mortar mixtures are known in the prior art. Examples of such accelerators are calcium nitrate, calcium formate, calcium chloride and lithium carbonate. A disadvantage of chloride- or nitrate-containing accelerators is their adverse effects on the corrosion resistance of, for example, steel-reinforced concrete. Due to national standards, there are use restrictions. Efflorescence on the surface of cured building materials can, especially when calcium salts are used, likewise represent a problem (for example in the case of calcium formate).

In many applications, it is necessary to achieve an even greater acceleration of setting and higher early strengths in cement-based systems, for example in mortar or concrete. However, the abovementioned types of accelerators and other commercial accelerators do not at present make it possible for a person skilled in the art to achieve this objective using relatively small amounts of the accelerator, for example less than 0.5% based on the mass of the (portland) cement used.

There is therefore a great need to achieve higher early strengths in many applications, which is not possible by means of the accelerators, in particular pulverulent accelerators, known at present in the prior art.

Suspensions of calcium silicate hydrate (C—S—H) have since recently been used as highly efficient accelerators in cement-containing building material mixtures such as concrete. They make it possible to achieve significantly higher early strengths (6 hours) compared to the commercial accelerators. Essentially no decrease in the final strengths (28 days) is observed. Such suspensions are described in WO 2010/026155 A1. WO 2010/026155 A1 also indicates that the suspensions can be dried by conventional processes such as spray drying. However, for practical reasons, it is not possible to formulate dry mortar mixtures containing essentially (portland) cement as binder or other binder systems which set hydraulically in the presence of water using the water-containing suspensions of calcium silicate hydrate (C—S—H) since the water content of the suspensions would lead to an unacceptable, at least partially premature hydration of the binder.

As in the case of non-dry mortar applications such as concrete, there is a great need in the technical field of cement-containing dry mortar mixtures for suitable, in particular dry, preferably pulverulent, highly effective accelerators so as to make a significant increase in the early strengths (after 6 hours) possible even in dry mortar systems, preferably without decreases in the final strengths (strengths after 28 days). In the concrete sector, dry or pulverulent additives are not absolutely necessary, but cost advantages can be achieved by the avoidance of unnecessary transport of water. Efflorescence on the surface of the cured building materials should also be prevented if possible.

Therefore, provided are accelerators which overcome the abovementioned disadvantages of the prior art. In particular, the accelerators may make possible an effective increase in the early strengths, in the case of dry mortar mixtures at the same time give good compatibility with water-sensitive binders or binders which set hydraulically in the presence of water, for example (portland) cement. The final strengths (after 28 days) of the building material mixtures may not to be adversely affected while the early strengths may be increased.

Provided is a process for producing solid, optionally pulverulent compositions containing calcium silicate hydrate and a water-soluble comb polymer which is suitable as plasticizer for hydraulic binders, comprising:
a) contacting of an aqueous suspension containing calcium silicate hydrate which is optionally suitable as setting and curing accelerator for (portland) cement-containing binder systems with at least one water-soluble comb polymer which is suitable as plasticizer for hydraulic binders,
b) optionally setting of a suitable solids content of the product from step a) by dilution with water and
c) drying of the product from step a) or b), optionally at temperatures below 150° C.

Provided are compositions which may be obtained from the present processes. Also provided are processes of using the present compositions as curing accelerators in building material mixtures containing (portland) cement, slag sand, fly ash, silica dust, metakaolin, natural pozzolanas, calcined oil shales and/or calcium aluminate cement, optionally using (portland) cement and binders based on calcium sulphate, further optionally using essentially (portland) cement as binder. The processes of using the present compositions in building material mixtures may comprise mixing the compositions with (portland) cement, slag sand, fly ash, silica dust, metakaolin, natural pozzolanas, calcined oil shales and/or calcium aluminate cement, and water.

Also provided are building material mixtures containing the present compositions which can be obtained from the subject process and (portland) cement, slag sand, fly ash, silica dust, metakaolin, natural pozzuolanas, calcined oil shales and/or calcium aluminate cement, optionally (portland) cement and binders based on calcium sulphate, further optionally essentially (portland) cement as binder. Also provided are processes of using the present solid compositions which can be obtained from the subject process as grinding aids in the production of cement, comprising mixing the composition(s) with clinker or clinker blend before or during grinding of the clinker or clinker blend.

It has surprisingly been found that, in the present processes, carrying out the step a) "mixing of an aqueous suspension containing calcium silicate hydrate which is optionally suitable as setting and curing accelerator for (portland) cement-containing binder systems with at least one water-soluble comb polymer which is suitable as plasticizer for hydraulic binders" may enable a very substantial increase in the efficiency as accelerator of the solid compositions obtained after the drying step c). It was particularly surprising that it was important to carry out step a), regardless of whether or not the abovementioned suspension containing calcium silicate hydrate contains, for example according to the teaching of WO 2010/026155 A1, a water-soluble comb polymer which is suitable as plasticizer for hydraulic binders.

Without limitation, the comb polymers used in process step a) may act as an aid for the drying of suspensions containing calcium silicate hydrate. The drying aid, a comb polymer which is water-soluble and is suitable as plasticizer for hydraulic binders has the purpose of making it possible to produce solid compositions as described herein which may be particularly efficient as accelerators. Carrying out process step a) thus may prevent, in particular, a decrease in the accelerator efficiency of the solid compositions which can be obtained from drying step c) and contain calcium silicate hydrate and a water-soluble comb polymer which is suitable as plasticizer for hydraulic binders. This process step or the effect associated therewith is neither described nor suggested in WO 2010/026155 A1.

The present compositions which can be obtained from the subject process may be present in the solid state, such as in the pulverulent state. The compositions may be accelerator compositions and may be suitable as setting and curing accelerators for (portland) cement-containing binder systems. The proportion of water in the solid composition of the invention may be less than 15% by weight, in certain embodiments less than 10% by weight. The abovementioned proportion of water can encompass both free water still present in the solid composition and water bound in the calcium silicate hydrate. The water content of the powders may be determined by drying to constant weight at 60° C. in a drying oven, with the weight difference found being regarded as the proportion of water.

An inorganic component and an organic component may be present in the subject compositions. The inorganic component may be considered to be a modified, preferably finely divided calcium silicate hydrate (C—S—H) which can contain foreign ions such as magnesium and aluminium. The composition of the inorganic component calcium silicate hydrate (C—S—H) may be described by the following formula:

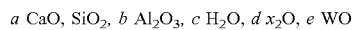
$a$ CaO, SiO$_2$, $b$ Al$_2$O$_3$, $c$ H$_2$O, $d$ $x_2$O, $e$ WO where
X is an alkali metal,
W is an alkaline earth metal, in certain embodiments W is an alkaline earth metal which is different from calcium,

| | | |
|---|---|---|
| $0.1 \leq a \leq 2$ | optionally | $0.66 \leq a \leq 1.8$ |
| $0 \leq b \leq 1$ | optionally | $0 \leq b \leq 0.1$ |
| $1 \leq c \leq 6$ | optionally | $1 \leq c \leq 6.0$ |
| $0 \leq d \leq 1$ | optionally | $0 \leq d \leq 0.4$ |
| $0 \leq e \leq 2$ | optionally | $0 \leq e \leq 0.1$ |

In certain embodiments, the molar ratios may be selected so that they are in the optional ranges for a, b and e ($0.66 \leq a \leq 1.8$; $0 \leq b \leq 0.1$; $0 \leq e \leq 0.1$).

The calcium silicate hydrate may be present in the form of foshagite, hillebrandite, xonotlite, nekoite, clinotobermorite, 9 Å—tobermorite (riversiderite), 11 Å—tobermorite, 14 Å—tobermorite (plombierite), jennite, metajennite, calcium chondrodite, afwillite, α—C$_2$SH, dellaite, jaffeite, rosenhahnite, killalaite and/or suolunite, particularly preferably as xonotlite, 9 Å—tobermorite (riversiderite), 11 Å—tobermorite, 14 Å—tobermorite (plombierite), jennite, metajennite, afwillite and/or jaffeite in the compositions which can be obtained from the process. The molar ratio of calcium to silicon in the calcium silicate hydrate may be from 0.6 to 2 and in certain embodiments from 0.66 to 1.8. The molar ratio of calcium to water in the calcium silicate hydrate may be from 0.6 to 6, in certain embodiments from 0.6 to 2 and in certain embodiments 0.8 to 2.

The organic component may be the plasticizer used in process step a) "mixing of an aqueous suspension containing calcium silicate hydrate which is preferably suitable as setting and curing accelerator for (portland) cement-containing binder systems with at least one water-soluble comb polymer which is suitable as plasticizer for hydraulic binders." These are described in WO 2010/026155 A1. The teaching of WO 2010/026155 A1 in respect of the water-soluble comb polymers which are suitable as plasticizer for hydraulic binders is incorporated by reference herein. A water-soluble comb polymer may be a polymer whose solubility in water at 20° C. may be greater than 1 g/l, in certain embodiments greater than 10 g/l and in certain embodiments greater than 100 g/l.

The present comb polymers may be polymers which have relatively long side chains (having a molecular weight of in each case at least 200 g/mol, particularly at least 400 g/mol) at more or less regular intervals on a linear main chain. The lengths of these side chains may be of approximately equal length, but may also deviate greatly from each other (e.g. when polyether macromonomers having side chains of different lengths are polymerized in). Such polymers may be obtained, for example, by free-radical polymerization of acid monomers and polyether macromonomers. An alternative route to such comb polymers may be esterification or amidation of poly(meth)acrylic acid and similar (co)polymers, for example acrylic acid-maleic acid copolymers, by means of suitable monohydroxy-functional or monoaminofunctional polyalkylene glycols, preferably alkylpolyethylene glycols. Comb polymers which may be obtained by esterification and/or amidation of poly(meth)acrylic acid are described, for example, in EP 1138697B1, which is incorporated by reference herein.

The average molecular weight $M_w$ of the comb polymer which is suitable as plasticizer for hydraulic binders as determined by gel permeation chromography (GPC) may be from 5,000 to 200,000 g/mol, in certain embodiments from 10,000 to 80,000 g/mol, and in certain embodiments from 20,000 to 70,000 g/mol. The polymers were analysed by means of size exclusion chromography to determine the average molar mass and conversion (column combinations: OH-Pak SB-G, OH-Pak SB 804 HQ and OH-Pak SB 802.5

HQ from Shodex, Japan; eluent: 80% by volume of an aqueous solution of $HCO_2NH_4$ (0.05 mol/l) and 20% by volume of acetonitrile; injection volume: 100 μl; flow rate: 0.5 ml/min. The calibration to determine the average molar mass was carried out using linear poly(ethylene oxide) and polyethylene glycol standards. The peak of the copolymer was normalized to a relative height of 1 as a measure of the conversion and the height of the peak of the unreacted macromonomer/PEG-containing oligomer was used as a measure of the residual monomer content.

In certain embodiments, the water-soluble comb polymer which is suitable as plasticizer for hydraulic binders may meet the requirements of industrial standard EN 934-2 (February 2002).

In certain embodiments, mixing of a preparation A with a preparation B may occur in process step a). Preparation A is a suitable calcium silicate hydrate suspension, and preparation B is the water-soluble comb polymer which is suitable as plasticizer for hydraulic binders. The comb polymer can be used in dry form or in aqueous solution. In certain embodiments, a previously prepared calcium silicate hydrate suspension may be used in the process. Any in-situ production of the calcium silicate hydrate suspension during the mixing operation or after mixing with the comb polymer may therefore be ruled out. The mixture of preparation A with preparation B may be produced by conventional mixing processes.

Suspensions containing calcium silicate hydrate which may be suitable as setting and curing accelerators for (portland) cement-containing binder systems include the (process) products mentioned in the following text under 1.) to 5.). It is also possible to use a mixture of the (process) products 1.) to 5.) mentioned. The aqueous suspension containing calcium silicate hydrate of process step a) can thus, for example, be produced beforehand and then be used as starting material preparation A:

1.) Aqueous curing accelerator compositions which have been obtained according to the teaching of WO 2010/026155 A1 by a process for producing an aqueous curing accelerator composition by reaction of a water-soluble calcium compound with a water-soluble silicate compound in the presence of an aqueous solution containing a water-soluble comb polymer which is suitable as plasticizer for hydraulic binders; the teaching of WO 2010/026155 A1 in respect of the aqueous curing accelerator compositions which can be obtained from the process of WO 2010/026155 A1 is incorporated by reference herein. In certain embodiments, the compositions may be suspensions.

2.) Aqueous curing accelerator compositions which have been obtained according to the teaching of WO 2010/026155 A1 by a process for producing an aqueous curing accelerator composition by reaction of a calcium compound, such as a calcium salt, in certain embodiments a water-soluble calcium salt, with a silicon dioxide-containing component under alkaline conditions, wherein the reaction is carried out in the presence of an aqueous solution of a water-soluble comb polymer which is suitable as plasticizer for hydraulic binders: the teaching of WO 2010/026155 A1 in respect of the aqueous curing accelerator compositions which can be obtained from the process of WO 2010/026155 A1 is incorporated by reference herein. In certain embodiments, the compositions may be suspensions.

3.) Aqueous compositions which can be produced according to the teaching of a patent application filed on the same day as the present patent application at the European Patent Office. The application number is EP 11 163 423.4. These aqueous compositions contain, in particular, calcium silicate hydrate and at least one (co)polymer having carboxylic acid groups and/or carboxylate groups and sulphonic acid groups and/or sulphonate groups, wherein the molar ratio of the number of carboxylic acid groups and/or carboxylate groups to the sulphonic acid groups and/or sulphonate groups is from 1/20 to 20/1, optionally from 1/5 to 5/1, further optionally from 1/2 to 2/1. In certain embodiments, the compositions may be suspensions. The aqueous compositions or suspensions can, in one process, be produced by reaction of a water-soluble calcium compound with a water-soluble silicate compound in the presence of an aqueous solution containing at least one (co)polymer having carboxylic acid groups and/or carboxylate groups and sulphonic acid groups and/or sulphonate groups, wherein the ratio of the number of carboxylic acid groups and/or carboxylate groups to the sulphonic acid groups and/or sulphonate groups is from 1/20 to 20/1, optionally from 1/5 to 5/1, further optionally from 1/2 to 2/1. The aqueous compositions or suspensions can also be produced in a process by reaction of a calcium compound, such as a calcium salt and in certain embodiments a water-soluble calcium salt, with a silicon dioxide-containing compound under alkaline conditions, wherein the reaction takes place in the presence of an aqueous solution of a (co)polymer having carboxylic acid groups and/or carboxylate groups and sulphonic acid groups and/or sulphonate groups, where the molar ratio of the number of carboxylic acid groups and/or carboxylate groups to the sulphonic acid groups and/or sulphonate groups is from 1/20 to 20/1, optionally from 1/5 to 5/1, further optionally from 1/2 to 2/1. The abovementioned (co)polymers which can be prepared according to the teaching of the patent application having the application number EP 11 163 423.4 may be produced by free-radical (co)polymerization of monoethylenically unsaturated polymers having a carbon-carbon double bond. In certain embodiments carboxylic acid monomers may be used, such as monocarboxylic acid monomers, and monomers containing sulphonic acid groups in the preparation of the disclosed (co)polymers. The term carboxylic acid monomer also includes the monomers present in salt form as carboxylate (carboxylate monomers) and the term monomers containing sulphonic acid groups also includes the monomers present in salt form as sulphonate (sulphonate monomers). These can also be present in mixed form.

Examples of suitable carboxylic acid monomers are (meth)acrylic acid, ethacrylic acid, α-chloroacrylic acid, α-cyanoacrylic acid, β-methacrylic acid (crotonic acid), α-phenylacrylic acid, β-acryloxypropionoic acid, sorbic acid, α-chlorosorbic acid, 2'-methylisocrotonic acid, cinnamic acid, p-chlorocinnamic acid, β-stearyl acid, itaconic acid, citraconic acid, mesacronic acid, glutaconic acid, aconitic acid, maleic acid, fumaric acid and/or tricarboxyethylene, with particular preference being given to (meth)acrylic acid, in particular acrylic acid. In certain embodiments, monocarboxylic acids may be suitable. It is possible to use one or more carboxylic acid monomers. In certain embodiments, maleic acid, when used in relatively high proportions, may be less well suited since, owing to the relatively high affinity for calcium ions (α-carboxyl groups), a retarding influence on the setting behaviour is observed. The proportion of carboxylic acid groups from maleic acid may be less than 20 mol % of all carboxylic acid groups in the copolymer, in certain embodiments, less than 10 mol %; and in certain embodiments maleic acid monomer may not be used.

Examples of suitable sulphonic acid monomers are one or more of the monomer species (meth)allylsulphonic acid, vinylsulphonic acid, stryenesulphonic acid, 2-acrylamido-2-methylpropanesulphonic acid, 2-methacrylamido-2-methylpropanesulphonic acid, 2-acrylamidobutanesulphonic acid and 2-acrylamido-2,4,4-trimethylpentanesulphonic acid or in each case the salts of the acid mentioned. In certain embodiments, 2-acrylamido-2-methylpropanesulphonic acid (AMPS) and salt compounds thereof may be suitable. The cations belonging to the salt compounds of the acids are not subject to any particular restrictions and can in each case preferably be present as monovalent or divalent metal cations such as sodium, potassium, calcium or magnesium ions or as ammonium ions derived from ammonia, primary, secondary or tertiary $C_1$-$C_{20}$-alkylamines, $C_1$-$C_{20}$-alkanolamines, $C_5$-$C_8$-cycloalkylamines and $C_6$-$C_{14}$-arylamines. The alkyl radicals can in each case be branched or unbranched. Examples of such amines are methylamine, dimethylamine, trimethylamine, ethanolamine, diethanolamine, triethanolamine, cyclohexylamine, dicyclohexylamine, phenylamine and diphenylamine. In certain embodiments, alkali metal ions and/or ammonium ions, such as the sodium ion, may be suitable as cations. The (co)polymer may be obtained from a free-radical (co)polymerization and the carboxylic acid groups and/or carboxylate groups may be derived from monocarboxylic acid monomers, such as (meth)acrylic acid, and in certain embodiments, acrylic acid may be suitable. The (co)polymer may be able to be obtained from a free-radical (co)polymerization and the carboxylic acid groups and/or carboxylate groups may be derived from the monomers acrylic acid and/or methacrylic acid, in certain embodiments acrylic acid, and the sulphonic acid groups and/or sulphonate groups may be derived from 2-acrylamido-2-methylpropanesulphonic acid. The weight average molecular weight $M_w$ of the (co)polymer(s) may be from 8,000 g/mol to 200,000 g/mol, in certain embodiments from 10,000 to 50,000 g/mol. The average molecular weight $M_w$ may in each case be determined by means of size exclusion chromatography to determine the average molar mass and conversion (column combinations: OH-Pak SB-G, OH-Pak SB 804 HQ and OH-Pak SB 802.5 HQ from Shodex, Japan; eluent: 80% by volume of an aqueous solution of $HCO_2NH_4$ (0.05 mol/l) and 20% by volume of acetonitrile; injection volume: 100 μl; flow rate: 0.5 ml/min). The calibration to determine the average molar mass was carried out using linear poly(ethylene oxide) and polyethylene glycol standards.

4.) Aqueous curing accelerator compositions which have been obtained according to the teaching of WO 2011/026720 by means of a process for producing an aqueous curing accelerator composition by reaction of a water-soluble calcium compound with a water-soluble silicate compound in the presence of an aqueous solution of a polycondensate containing
(I) at least one structural unit made up of an aromatic or heteroaromatic unit which has a polyether side chain and
(II) at least one structural unit made up of an aromatic or heteroaromatic unit which has at least one phosphoric ester group and/or a salt thereof.

5.) Aqueous curing accelerator compositions which have been obtained according to the teaching of WO 2011/026720 by means of a process for producing an aqueous curing accelerator composition by reaction of a calcium component with a silicon dioxide-containing component under alkaline conditions in the presence of an aqueous solution of a polycondensate containing
(I) at least one structural unit made up of an aromatic or heteroaromatic unit which has a polyether side chain and
(II) at least one structural unit made up of an aromatic or heteroaromatic unit which has at least one phosphoric ester group and/or a salt thereof.

The reactants A (Preparation A) identified under 1.) to 3.) may, in addition to the features identified at each of 1.) to 3.), comprise further polymers which comprise at least one polyether side chain and at least one phosphoric ester group and/or the salt residue thereof. The polyether side chain may be a polyalkylene glycol, in certain embodiments, a polyethylene glycol.

The further polymers may be polycondensation products which comprise
(I) at least one structural unit consisting of an aromatic or heteroaromatic radical containing a polyether side chain, such as a polyalkylene glycol side chain, and in certain embodiments, a polyethylene glycol side chain, and
(II) at least one structural unit consisting of an aromatic or heteroaromatic radical containing at least one phosphoric ester group and/or the salt thereof.

In certain embodiments, the structural units (I) and (II) may be defined by the following general formulae,

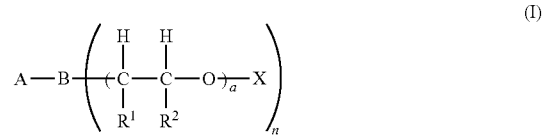

where
A is identical or different and is represented by a substituted or unsubstituted aromatic or heteroaromatic compound having 5 to 10 C atoms
where
B is identical or different and is represented by N, NH or O
where
n is 2, if B is N, and n is 1 if B is NH or O
where
$R^1$ and $R^2$ independently of one another are identical or different and are also represented by a branched or unbranched $C_1$ to $C_{10}$ alkyl radical, $C_5$ to $C_8$ cycloalkyl radical, aryl radical, heteroaryl radical or H
where
a is identical or different and is represented by an integer from 1 to 300
where
X is identical or different and is represented by a branched or unbranched $C_1$ to $C_{10}$ alkyl radical, $C_5$ to $C_8$ cycloalkyl radical, aryl radical, heteroaryl radical or H, preferably H,

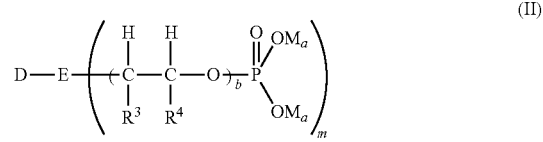

where
D is identical or different and is represented by a substituted or unsubstituted heteroaromatic compound having 5 to 10 C atoms where E is identical or different and is represented by N, NH or O where m is 2, if E is N, and m is 1, if E is NH or O where $R^3$ and $R^4$ independently of one another are identical or different and are represented by a branched or unbranched $C_1$ to $C_{10}$ alkyl radical, $C_5$ to $C_8$ cycloalkyl radical, aryl radical, heteroaryl radical or H where b is identical or different and is represented by an integer from 1 to 300 where

M independently at each occurrence is an alkali metal ion, alkaline earth metal ion, ammonium ion, organic ammonium ion and/or H, a is 1 or in the case of alkaline earth metal ions is ½.

The groups A and D in the general formulae (I) and (II) of the polycondensation product may be represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl, and A and D may be selected independently of one another and may also each consist of a mixture of the stated compounds. The groups B and E are represented independently of one another, in certain embodiments by O. The radicals $R^1$, $R^2$, $R^3$ and $R^4$ may be selected independently of one another and may be represented by H, methyl, ethyl or phenyl, in certain embodiments by H or methyl and in certain embodiments by H.

In the general formula (I), a is represented by an integer from 1 to 300, in certain embodiments 3 to 200 and in certain embodiments 5 to 150, and b in the general formula (II) is represented by an integer from 1 to 300, in certain embodiments 1 to 50 and in certain embodiments 1 to 10. The respective radicals, whose length is defined by a or b, respectively, may consist in this case of uniform structural groups, although it may also be appropriate for them to comprise a mixture of different structural groups. In addition, the radicals of the general formulae (I) or (II) may independently of one another each possess the same chain length, with a and b each represented by one number. It may be appropriate for mixtures with different chain lengths to be present in each case, and so the radicals of the structural units in the polycondensation product have different numerical values for a and, independently, for b.

The phosphatized polycondensation product frequently has a weight-average molecular weight of 5,000 g/mol to 200,000 g/mol, in certain embodiments 10,000 to 100,000 g/mol and in certain embodiments 15,000 to 55,000 g/mol.

The phosphatized polycondensation product may also be present in the form of its salts, such as, for example, the sodium, potassium, organic ammonium, ammonium and/or calcium salt, in certain embodiments as sodium and/or calcium salt.

The molar ratio of the structural units (I):(II) may be 1:10 to 10:1 and in certain embodiments may be 1:8 to 1:1.

In one embodiment, the polycondensation product may comprise in the reactants A (Preparation A) a further structural unit (III) which is represented by the following formula:

(III)

where

Y independently at each occurrence is identical or different and is represented by (I), (II) or other constituents of the polycondensation product where $R^5$ is identical or different and is represented by H, $CH_3$, COOH or a substituted or unsubstituted aromatic or heteroaromatic compound having 5 to 10 C atoms, in certain embodiments H where $R^6$ is identical or different and is represented by H, $CH_3$, COOH or substituted or unsubstituted aromatic or heteroaromatic compound having 5 to 10 C atoms, in certain embodiments H.

$R^5$ and $R^6$ in structural unit (III) are independently of one another identical or different and are represented by H, COOH and/or methyl, and in certain embodiments, H.

In another embodiment, the molar ratio of the structural units [(I)+(II)]:(III) in the polycondensate is 1:0.8 to 3.

Further information on the phosphatized polycondensation products and their preparation can be found in the disclosure content of WO 2011/026720 A1.

In certain embodiments, provided are compositions comprising calcium silicate hydrate where the calcium silicate hydrate does not originate from a hydration reaction of (portland) cement with water, and at least one (co)polymer which contains carboxylic acid groups and/or carboxylate groups and sulphonic acid groups and/or sulphonate groups, the molar ratio of the number of carboxylic acid groups and/or carboxylate groups to the sulphonic acid groups and/or sulphonate groups being from 1/20 to 20/1.

In certain embodiments, provided are compositions comprising calcium silicate hydrate and at least one (co)polymer which contains carboxylic acid groups and/or carboxylate groups and sulphonic acid groups and/or sulphonate groups, the molar ratio of the number of carboxylic acid groups and/or carboxylate groups to the sulphonic acid groups and/or sulphonate groups being from 1/20 to 20/1, the composition comprising no (portland) cement. In certain embodiments, provided are compositions comprising calcium silicate hydrate and at least one (co)polymer which contains carboxylic acid groups and/or carboxylate groups and sulphonic acid groups and/or sulphonate groups, the molar ratio of the number of carboxylic acid groups and/or carboxylate groups to the sulphonic acid groups and/or sulphonate groups being from 1/20 to 20/1, the composition comprising no (portland) cement which has come into contact with water. By (portland) cement which has come into contact with water is meant, additionally, mixtures of (portland) cement and water which have undergone interim drying, and which may contain a preferably small proportion of water.

The solid compositions which can be obtained from the process may contain salts, in certain embodiments water-soluble salts having a solubility in water at 20° C. of greater than 1 g/l. In certain embodiments, the salts in terms of the anionic component may be sulphates, nitrates, halides, thiocyanates [CH1], formates and/or acetates. As regards the cationic component, the salts may include alkali metals, such as sodium and/or potassium. Examples of suitable salts are sodium nitrate, sodium acetate, sodium formate and sodium sulphate.

The present processes may be carried out in the absence of binders, such as in the absence of hydraulic binders, and in certain embodiments in the absence of (portland) cement. The process products accordingly may not contain any binders, such as no (portland) cement. In certain embodiments, in the present solid process products, the calcium silicate hydrate may not originate from a hydration reaction of (portland) cement with water. In certain embodiments, the present solid compositions may comprise no (portland) cement which has come into contact with water.

In certain embodiments, in process step b), a suitable solids content may be 5-50% by weight, in certain embodiments from 15 to 25% by weight. These ranges may provide a suitable viscosity of the spray feed. Apart from water, it is also possible to use other solvents which do not cause any problems during spray drying and are suitable for setting an appropriate viscosity.

In certain embodiments, the drying step c) is may be carried out at low temperatures, in certain embodiments at low temperatures and reduced pressure. The drying temperature selected may be less than 150° C., in certain embodiments less than 100° C., in certain embodiments less than 80° C. and in certain embodiments in the range from 15° C. to 80° C., in order to avoid dehydration of the calcium silicate hydrate particles. A convention drying oven, vacuum drying oven or fluidized-bed dryer may be suitable for drying. In certain embodiments, the drying method may be the spray drying process since relatively high drying rates may be achieved.

In certain embodiments, provided is a process wherein the solid composition which can be obtained from the process has a weight ratio of the (co)polymer or (co)polymers to the calcium silicate hydrate of from 1/100 to 100/1, in certain embodiments from 1/10 to 50/1, and in certain embodiments from 1/5 to 20/1. The comb polymer which is suitable as plasticizer for hydraulic binders may originate from process step a), i.e. has been added to the calcium silicate hydrate suspension in this step. Any comb polymers which are present in the calcium silicate hydrate suspension used as starting material (for example according to the teaching of WO 2010/026155 A1) are not taken into account in the abovementioned ratios. Any comb polymers present in the calcium silicate hydrate suspension used as starting material may display barely any stabilizing effect on the accelerator compositions during the drying operation.

In certain embodiments, provided is a process wherein the aqueous suspension containing calcium silicate hydrate used in process step a) has been obtained either by reaction of a water-soluble calcium compound whose solubility in water at 20° C. may be more than 0.5 g/l, in certain embodiments more than 1.5 g/l, in certain embodiments more than 10 g/l, with a water-soluble silicate compound whose solubility in water at 20° C. may be more than 0.01 g/l, in certain embodiments more than 1 g/l, in certain embodiments more than 10 g/l, where the reaction of the water-soluble calcium compound with the water-soluble silicate compound is carried out in the presence of an aqueous solution containing a water-soluble comb polymer which is suitable as plasticizer for hydraulic binders, or wherein the aqueous suspension of calcium silicate hydrate used in process step a) has been obtained by reaction of a calcium compound, such as a calcium salt and in certain embodiments a water-soluble calcium salt, with a silicon dioxide-containing compound under alkaline conditions in the presence of an aqueous solution containing a water-soluble comb polymer which is suitable as plasticizer for hydraulic binders. These processes are disclosed in WO 2010/026155 A1.

In certain embodiments, provided is a process wherein the aqueous suspension containing calcium silicate hydrate used in process step a) has either been obtained by reaction of a water-soluble calcium compound whose solubility in water at 20° C. may be more than 0.5 g/l, in certain embodiments more than 1.5 g/l, in certain embodiments more than 10 g/l, with a water-soluble silicate compound whose solubility in water at 20° C. may be more than 0.01 g/l, in certain embodiments more than 1 g/l, in certain embodiments more than 10 g/l, where the reaction of the water-soluble calcium compound with the water-soluble silicate compound is carried out in the presence of an aqueous solution of a (co)polymer having carboxylic acid groups and/or carboxylate groups and sulphonic acid groups and/or sulphonate groups, where the molar ratio of the number of carboxylic acid groups and carboxylate groups to the sulphonic acid groups and/or sulphonate groups in the (co)polymer is from 1/20 to 20/1, or the aqueous suspension of calcium silicate hydrate used in process step a) has been obtained by reaction of a calcium compound, such as a calcium salt and in certain embodiments a water-soluble calcium salt, whose solubility in water at 20° C. may be more than 1.5 g/l, in certain embodiments more than 10 g/l at 20° C., with a silicon dioxide-containing compound under alkaline conditions in the presence of an aqueous solution of a (co)polymer having carboxylic acid groups and/or carboxylate groups and sulphonic acid groups and/or sulphonate groups, where the molar ratio of the number of carboxylic acid groups and/or carboxylate groups to the sulphonic acid groups and/or sulphonate groups in the (co)polymer is from 1/20 to 20/1.

In certain embodiments, provided is a process wherein the water-soluble comb polymer which is suitable as plasticizer for hydraulic binders and is used in process step a) is present as a copolymer which contains ether functions, such as in the form of polyalkylene glycols of the general formula $(AO)_n$, where the radicals A are each, independently of one another, an alkylene radical having from 2 to 4 carbon atoms, O is oxygen and n is an integer from 2 to 350, in certain embodiments from 10 to 200, in certain embodiments from 50 to 150, and also contains side chains having acid functions, in particular carboxyl groups and/or carboxylate groups, on the main chain.

In certain embodiments, provided is a process wherein the water-soluble comb polymer which is suitable as plasticizer for hydraulic binders which is used is present as a copolymer which has been produced by free-radical polymerization in the presence of acid monomers and polyether macromonomers, so that a total of at least 45 mol %, in certain embodiments at least 80 mol %, of all structural units of the copolymer have been produced by copolymerization of acid monomers, such as monomers containing carboxyl groups and/or carboxylate groups, and polyether macromonomers. Suitable acid monomers include (meth)acrylic acid and/or maleic acid, in certain embodiments acrylic acid.

In certain embodiments, provided is a process wherein the free-radical copolymerization has produced a copolymer having a structural unit which can be obtained by copolymerization of the acid monomer and corresponds to one of the general formulae (Ia), (Ib), (Ic) and/or (Id):

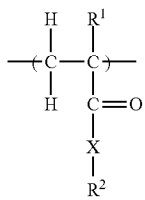

(Ia)

where
the radicals $R^1$ are identical or different and are each H and/or an unbranched or branched $C_1$-$C_4$ alkyl group;
the radicals X are identical or different and are each NH—$(C_nH_{2n})$ where n=1, 2, 3 or 4 or O—$(C_nH_{2n})$ where n=1, 2, 3 or 4 or an absent unit;
the radicals $R^2$ are identical or different and are each OH, $SO_3H$, $PO_3H_2$, O—$PO_3H_2$ or para-substituted $C_6H_4$—$SO_3H$, with the proviso that if X is an absent unit, $R^2$ is OH;

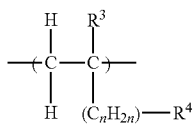

(Ib)

where
the radicals $R^3$ are identical or different and are each H or an unbranched or branched $C_1$-$C_4$ alkyl group;
n=0, 1, 2, 3 or 4;
the radicals $R^4$ are identical or different and are each $SO_3H$, $PO_3H_2$, O—$PO_3H_2$ or para-substituted $C_6H_4$—$SO_3H$;

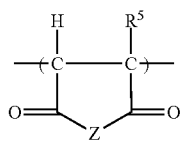

(Ic)

where
the radicals $R^5$ are identical or different and are each H or an unbranched or branched $C_1$-$C_4$ alkyl group;
the radicals Z are identical or different and are each O or NH;

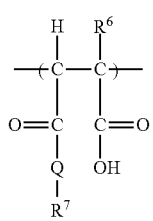

(Id)

where
the radicals $R^6$ are identical or different and are each H or an unbranched or branched $C_1$-$C_4$ alkyl group;
the radicals Q are identical or different and are each NH or O;
the radicals $R^7$ are identical or different and are each H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ or $(C_mH_{2m})_e$—O-$(A'O)_\alpha$—$R^9$ where m=0, 1, 2, 3 or 4, e=0, 1, 2, 3 or 4, $A'=C_{x'}H_{2x'}$, where x'=2, 3, 4 or 5 or $CH_2C(C_6H_5)H$—, $\alpha$=an integer from 1 to 350 and the radicals $R^9$ are identical or different and are each an unbranched or branched $C_1$-$C_4$ alkyl group.

In certain embodiments, provided is a process wherein the free-radical copolymerization has produced a copolymer containing a structural unit which can be obtained by copolymerization of the polyether macromonomer and corresponds to one of general formula (IIa), (IIb), (IIc) and/or (IId):

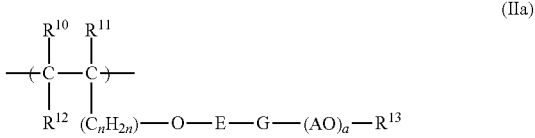

(IIa)

where
$R^{10}$, $R^{11}$ and $R^{12}$ are identical or different and are each, independently of one another, H or an unbranched or branched $C_1$-$C_4$ alkyl group;
the radicals E are identical or different and are each an unbranched or branched $C_1$-$C_6$ alkylene group, a cyclohexyl group, $CH_2$—$C_6H_{10}$, ortho-, meta- or para-substituted $C_6H_4$ or an absent unit;
the radicals G are identical or different and are each O, NH or CO—NH, with the proviso that if E is an absent unit, G is also an absent unit;
the radicals A are identical or different and are each $C_xH_{2x}$ where x=2, 3, 4 or 5 (preferably x=2) or $CH_2CH(C_6H_5)$;
the indices n are identical or different and are each 0, 1, 2, 3, 4 or 5;
the indices a are identical or different and are each an integer from 2 to 350 (optionally 10-200);
the radicals $R^{13}$ are identical or different and are each H, an unbranched or branched $C_1$-$C_4$ alkyl group, CO—$NH_2$ or $COCH_3$;

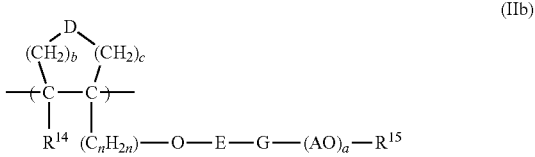

(IIb)

where
the radicals $R^{14}$ are identical or different and are each H or an unbranched or branched $C_1$-$C_4$ alkyl group;
the radicals E are identical or different and are each an unbranched or branched $C_1$-$C_6$ alkylene group, a cyclohexyl group, $CH_2$—$C_6H_{10}$, ortho-, meta- or para-substituted $C_6H_4$ or an absent unit;
the radicals G are identical or different and are each an absent unit, O, NH or CO—NH, with the proviso that if E is an absent unit, G is also an absent unit;
the radicals A are identical or different and are each $C_xH_{2x}$ where x=2, 3, 4 or 5 or $CH_2CH(C_6H_5)$;
the indices n are identical or different and are each 0, 1, 2, 3, 4 or 5;

the indices a are identical or different and are each an integer from 2 to 350;
the radicals D are identical or different and are each an absent unit, NH or O, with the proviso that if D is an absent unit: b=0, 1, 2, 3 or 4 and c=0, 1, 2, 3 or 4, where b+c=3 or 4, and with the proviso that when D is NH or O: b=0, 1, 2 or 3, c=0, 1, 2 or 3, where b+c=2 or 3;
the radicals $R^{15}$ are identical or different and are each H, an unbranched or branched $C_1$-$C_4$ alkyl group, CO—$NH_2$ or $COCH_3$;

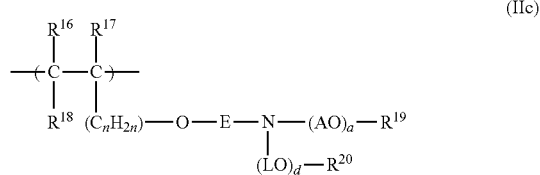

(IIc)

where
$R^{16}$, $R^{17}$ and $R^{18}$ are identical or different and are each, independently of one another, H or an unbranched or branched $C_1$-$C_4$ alkyl group;
the radicals E are identical or different and are each an unbranched or branched $C_1$-$C_6$ alkylene group, a cyclohexyl group, $CH_2$—$C_6H_{10}$, ortho-, meta- or para-substituted $C_6H_4$ or an absent unit;
the radicals A are identical or different and are each $C_xH_{2x}$ where x=2, 3, 4 or 5 $CH_2$—$CH(C_6H_5)$;
the indices n are identical or different and are each 0, 1, 2, 3, 4 or 5;
the radicals L are identical or different and are each $C_xH_{2x}$ where x=2, 3, 4 or 5 or $CH_2$—$CH(C_6H_5)$;
the indices n are identical or different and are each an integer from 2 to 350;
the indices d are identical or different and are each an integer from 1 to 350;
the radicals $R^{19}$ are identical or different and are each H and/or an unbranched or branched $C_1$-$C_4$ alkyl group, the radicals $R^{20}$ are identical or different and are each H or an unbranched $C_1$-$C_4$ alkyl group;

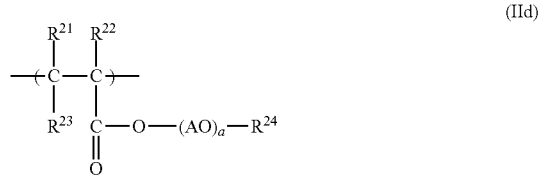

(IId)

where
$R^{21}$, $R^{22}$ and $R^{23}$ are identical or different and are each, independently of one another, H or an unbranched or branched $C_1$-$C_4$ alkyl group;
the radicals A are identical or different and are each $C_xH_{2x}$ where x=2, 3, 4 or 5 or $CH_2CH(C_6H_5)$;
the indices a are identical or different and are each an integer from 2 to 350;
the radicals $R^{24}$ are identical or different and are each H or an unbranched or branched $C_1$-$C_4$ alkyl radical.

In certain embodiments, provided is a process wherein the water-soluble comb polymer which is suitable as plasticizer for hydraulic binders and is used in process step a) has an average ratio of the number of moles of carboxyl and/or carboxylate groups to the total molar mass of the comb polymer of from 1/200 to 1/1500 mol/(g/mol), in certain embodiments from 1/300 to 1/700 mol/(g/mol), in certain embodiments from 1/300 to 1/400 mol/(g/mol). Cations, including protons, associated with the comb polymer are not taken into account in calculating the total molar mass of the comb polymer. The calculation of the total molar mass in the case of, for example, copolymerized acrylic acid structural units or other carboxylic acid units which have been neutralized with, for example, sodium hydroxide, thus does not take into account the cation $Na^+$. Should no neutralization be carried out, the cations ("$H^+$") located on the carboxylic acid groups would likewise not be taken into account.

The abovementioned parameter is a measure of the charge density in the comb polymer or polymers. It has been found that the range specified in the dependent claim makes it possible to achieve particularly good results. A relatively high average ratio of the number of moles of carboxyl and/or carboxylate groups to the total molar mass of the comb polymer may provide an increase in the accelerating effect of the dried compositions. This can also be seen from the examples; in particular, KP2 and KP3 gave particularly good results (Tables 2, 3 and in particular Table 4). These values are even comparable in terms of effectiveness with the (undried) reference suspension X-Seed®100. However, to achieve a good action as (spray) drying aid, the charge density must not be too high since otherwise a retarding effect (for example in the case of the reference polyacrylic acid) occurs. The formulation "carboxyl and/or carboxylate groups" means, for the purposes of the present patent application, that if both species are present, the sum of the two species is to be formed. The possibility of selecting carboxyl groups or carboxylate groups in the presence of both species may not be intended. In certain embodiments, carboxyl and/or carboxylate groups are to be considered as largely equivalent and of equal effect.

The average ratio of the number of moles of carboxyl and/or carboxylate groups to the total molar mass of the comb polymer may be defined as the ratio of the total number of moles of all carboxyl and/or carboxylate groups in the comb polymers (mol) to the total molar mass of the comb polymer (g/mol). Taking into account the number of moles of all charges, such as including all carboxyl and/or carboxylate groups, and the total molar mass in the comb polymers gives an average value.

In certain embodiments, the drying process c) may be spray drying.

Also provided are compositions which can be obtained by the present processes.

Also provided are processes of using compositions which can be obtained by the present processes as curing accelerators in building material mixtures containing (portland) cement, slag sand, fly ash, silica dust, metakaolin, natural pozzolanas, calcined oil shales and/or calcium aluminate cement, in certain embodiments containing (portland) cement and binders based on calcium sulphate, in further embodiments containing essentially (portland) cement as binder. The processes of using the compositions in building material mixtures may comprise mixing the compositions with (portland) cement, slag sand, fly ash, silica dust, metakaolin, natural pozzolanas, calcined oil shales and/or calcium aluminate cement, and water.

Also provided are processes of using the present compositions as grinding aids in the production of cement, such as in the grinding of the clinker or clinker blend to form the cement. By clinker blend is meant preferably a mixture of clinker and substitutes such as slag, fly ash and/or pozzuolanas. In this case the process products may be used in amounts of from 0.001% by weight to 5% by weight, in certain embodiments in amounts of from 0.01% by weight 0.5% by weight, based in each case on the clinker or clinker blend to be ground. It is possible to use the present process products as grinding aids in ball mills or in vertical mills. The present process products may be used as grinding aids alone or in combination with other grinding aids, such as, for example, mono-, di-, tri- and polyglycols, polyalcohols (for example glycerol in various degrees of purity, for example from the production of biodiesel), amino alcohols (e.g. MEA, DEA, TEA, TIPA, THEED, DIHEIPA), organic acids and/or salts thereof (e.g. acetic acid and/or salts thereof, formates, gluconates), amino acids, sugars, and residues from sugar production (e.g. molasses, vinasse), inorganic salts (chlorides, fluorides, nitrates, sulphates) and/or organic polymers (e.g. polyether carboxylates (PCEs)). It has been found that the early strengths, in particular, of the cement thus produced may be improved.

Also provided are processes of using the present compositions in a process for preparing a sprayable composition which comprises hydraulic binder and which comprises water, aggregates, hydraulic binder and accelerator, wherein the present calcium silicate hydrate-comprising composition is added before and/or at the spraying nozzle. Further preferred embodiments of the process for preparing a hydraulically setting, sprayable hydraulic binder composition are described in international application PCT/EP2010/062671. The corresponding accelerators of this patent application, based on calcium silicate hydrate, can be used in an analogous way in the processes of PCT/EP2010/062671. The content of PCT/EP2010/062671 is incorporated by reference herein.

In certain embodiments, the building material mixtures in which the present compositions may be used as curing accelerators may contain (portland) cement and at least one further component selected from the group consisting of slag sand, fly ash, silica dust, metakaolin, natural pozzuolanas, calcined oil shales and/or calcium aluminate cement. The proportion by mass of (portland) cement based on the total mass of the binder may be at least 5%, in certain embodiments at least 20%, in certain embodiments at least 40%.

The building material mixtures containing 1.) (portland) cement and 2.) binders based on calcium sulphate are not subject to any particular restrictions in terms of the mass ratios of 1.) and 2.). In certain embodiments, the ratio of 1.) to 2.) may be in the range from 9/1 to 1/9, in certain embodiments from 4/1 to 1/4.

The formulation "containing essentially (portland) cement as binder" as used herein means that the proportion of (portland) cement is at least 40% by weight based on the total mass of all binders, in certain embodiments at least 80% by weight, and in certain embodiments the (portland) cement represents 100% of the binder.

Also provided are building material mixtures containing the present compositions and (portland) cement, slag sand, fly ash, silica dust, metakaolin, natural pozzolanas, calcined oil shales and/or calcium aluminate cement, in certain embodiments (portland) cement and binders based on calcium sulphate, and in certain embodiments essentially (portland) cement as binder.

In certain embodiments, the building material mixtures may contain (portland) cement and at least one further component selected from the group consisting of slag sand, fly ash, silica dust, metakaolin, natural pozzuolanas, calcined oil shales and calcium aluminate cement. The proportion by mass of (portland) cement based on the total mass of the binders may be at least 5%, in certain embodiments at least 20%, in certain embodiments at least 40%.

As regards the weight ratios of 1.) (portland) cement to 2.) binders based on calcium sulphate and also with regard to the definition of "containing essentially (portland) cement as binder", the information given above applies in an analogous way.

Without limitation, illustrative building material mixtures are, for example, tile adhesive formulations, renders, adhesive mortars and reinforcing mortars, grouts, screeds and self-levelling knifing fillers.

In certain embodiments, the solid compositions according to the invention may be used in dry mortar mixtures, such as in powder form. The solid compositions may be added in amounts, based on the binder or binders, such as based on (portland) cement, of from 0.1 to 5% by weight, in certain embodiments from 0.1 to 2% by weight, or may be present in the building material mixtures in the weight ratios indicated.

For illustration, the term building material mixtures can refer to mixtures in dry or aqueous form and in the cured or plastic state. Dry building material mixtures may be, for example, mixtures of the abovementioned binders, particularly (portland) cement, and the subject curing accelerator compositions (such as in powder form). Mixtures in aqueous form, generally in the form of slurries, pastes, fresh mortar or fresh concrete, are produced by addition of water to the binder component or to the binder components and the curing accelerator composition; they may then go over from the plastic state to the cured state.

Binders based on calcium sulphate may be gypsum, α-hemihydrate, β-hemihydrate, bassanite and/or anhydrite.

The building material mixtures may contain, as other additives, for example antifoams, air pore formers, fillers, redispersible polymer powders, retarders, thickeners, water retention agents and/or wetting agents.

Examples

Polymerization of the Spray Aid (Polycarboxylate Ether (PCE)):
General method, in particular method for producing KP1 to KP8:

875 g of a 40% strength aqueous solution of polyethylene glycol hydroxybutyl monovinyl ether and NaOH (20%) were placed in a 1 liter four-neck flask provided with thermometer, reflux condenser and a connection for two feed streams. Details of the molar masses of the respective polyethylene glycol hydroxybutyl monovinyl ethers may be found in Table 2.

The solution was then cooled to 20° C. Acrylic acid (99%) was then slowly added to the polyethylene glycol hydroxybutyl monovinyl ether solution in the flask. The pH decreased to about 4-5. 0.5 g of iron(II) sulphate heptahydrate and 5 g of Rongalit and mercaptoethanol were then added thereto. After brief stirring, 3 g of 50% hydrogen peroxide were then introduced. This resulted in the temperature rising from 20° C. to about 30° C.-65° C. The solution was subsequently stirred for 10 minutes before being neutralized with sodium hydroxide solution (20%). This gave a light-yellow, clear aqueous polymer solution having a solids content of about 40% by weight. All variable amounts indicated for the chemicals used in the preparation of the polycarboxylate ethers KP1 to KP8 (NaOH, mercaptoethanol and acrylic acid) and the molar masses of the respective polyethylene glycol hydroxybutyl monovinyl ether are shown in Tables 1 and 2 below.

TABLE 1

Details of the preparation of PCE

|  | NaOH (20%) [g] | Mercaptoethanol [g] | Acrylic acid (99%) [g] |
|---|---|---|---|
| KP 1 | 30 | 5 | 152 |
| KP 2 | 20 | 2.7 | 84.9 |
| KP 3 | 20 | 2.8 | 87 |
| KP 4 | 10 | 2 | 69.5 |
| KP 5 | 10 | 1.7 | 42.4 |
| KP 6 | 0 | 1.5 | 24.1 |
| KP 7 | 0 | 1.4 | 21 |
| KP 8 | 0 | 1 | 17 |

Table 2 gives an overview of the structural parameters of the polycarboxylate ethers used as spraying aid.

TABLE 2

Overview of the structural parameters of the PCEs

| Additive (PCE) | Charge density (number of moles of carboxylate and/or carboxyl groups/total molar mass of the PCE) (mol/(g/mol)) | Weight average molecular weight $M_w$ (g/mol) | Molar mass of the polyethylene glycol hydroxybutyl monovinyl ether used (g/mol) |
|---|---|---|---|
| KP 1 | 1/239 | 20,571 | 500 |
| KP 2 | 1/372 | 23239 | 3000 |
| KP 3 | 1/365 | 40105 | 5800 |
| KP 4 | 1/438 | 25412 | 1100 |
| KP 5 | 1/672 | 28659 | 3000 |
| KP 6 | 1/1128 | 47424 | 5800 |
| KP 7 | 1/1284 | 27076 | 3000 |
| KP 8 | 1/1569 | 48806 | 3000 |
| KP9: MVA ® 2500 | 1/1344 | 27365 | 5800 |

As comparative example, a polyacrylic acid was prepared by the following method:

A 5% strength Wako V50 azo initiator solution (corresponds to 0.2 mol % of azo initiator) was placed in a 1 liter four-necked flask provided with thermometer, pH meter and reflux condenser. This mixture was heated to 75° C. under a blanket of nitrogen. After 75° C. had been reached, a 40% strength acrylic acid solution and 1 mol % of 2-mercaptoethanol were metered in over a period of 40 minutes. The temperature was maintained at about 80° C. by cooling. After the addition was complete, the mixture was stirred at 80° C. for another one hour. This gave a slightly yellowish, clear aqueous polymer solution having a solids content of about 40% by weight and a pH of about 3.

The weight average molecular weight $M_w$ of the polyacrylic acid was 18 350 g/mol. It was analysed by means of size exclusion chromatography to determine the average molar mass and conversion (column combinations: OH-Pak SB-G, OH-Pak SB 804 HQ and OH-Pak SB 802.5 HQ from Shodex, Japan; eluent: 80% by volume of an aqueous solution of $HCO_2NH_4$ (0.05 mol/l) and 20% by volume of acetonitrile; injection volume: 100 µl; flow rate: 0.5 ml/min). The calibration to determine the average molar mass was carried out using linear poly(ethylene oxide) and polyethylene glycol standards.

Production of the Dried Accelerator Compositions

X-Seed® 100 (BASF Construction Chemicals) was used as starting material (i.e. aqueous accelerator component to be dried). The X-Seed® suspension was mixed with 5% by weight of spraying aid (PCEs KP1 to KP9) based on the solids content of X-Seed® 100 for 10 minutes before drying. The figure 5% by weight of spraying aid was based on the solids content of the spraying aid. This means that 5% by weight calculated as water-free polycarboxylate ether were added in each case. The solids content of the X-Seed® 100 was 21.7% by weight. The preparation formed was converted into the pulverulent state by means of spray drying using a drier from Niro at inlet temperatures of 160° C. and outlet temperatures of 60-110° C. under a nitrogen atmosphere (Table 3).

TABLE 3

Experimental conditions for spray drying

| Experiment | Drying additive | Drying temperature (° C.) |
|---|---|---|
| Powder 1 (comp.) | X-Seed ® 100 dried without additive | 60 |
| Powder 0 (comp.) | Polyacrylic acid | 50-60 |
| Powder 2 | KP1 | 60 |
| Powder 3 | KP2 | 60 |
| Powder 4 | KP3 | 60 |
| Powder 5 | KP4 | 60 |
| Powder 6 | KP5 | 60 |
| Powder 7 | KP6 | 60 |
| Powder 8 | KP7 | 60 |
| Powder 9 | KP8 | 60 |
| Powder 10 | KP9 | 60 |
| Powder 11 | KP2 | 80 |
| Powder 12 | KP2 | 90 |
| Powder 13 | KP2 | 100 |
| Powder 14 | KP2 | 110 |

Use Tests (Mortar) on the Dried Accelerator Compositions

The effectiveness of the powders was tested by means of a standard mortar test. The mortar tests were carried out in accordance with DIN EN 197. To determine the compressive strength, the prisms were cast in Styropor moulds or in steel moulds. To be able to compare the measurements using the various accelerators, the amount added was in each case selected so that 1.44% by weight of the solid of X-Seed® 100, based on the mass of the cement, was added to the mortar in each experiment. This means that, of course, X-Seed® 100 was not added as such but instead a corresponding amount of solids content of the starting material X-Seed® 100 was added in the form of the processed pulverulent product.

The results of the tests are summarized in Table 4.
Mortar test at 20° C., 65% atmospheric humidity:
450 g of cement (Milke CEM 152.5 R)
1350 g of standard sand
225 g of water

TABLE 4

Results of the mortar tests

| Experiment | Accelerator | Accelerator (g) | Compressive strength after 6 h (MPa) | Mould |
|---|---|---|---|---|
| 1 (Comp.) | — | 0 | ~0.5 | Styropor |
| 2 (Comp.) | X-Seed ® 100 Suspension | 31.34 | 15.4 | Styropor |
| 3 (Comp.) | Powder 1 (no additives) | 6.43 | 7.2 | Styropor |
| 4 (Comp.) | Ca formate (100%) | 1.13 | not measurable | Styropor |
| 5 (Comp.) | Ca formate (100%) | 2.25 | 0.5 | Styropor |

TABLE 4-continued

Results of the mortar tests

| Experiment | Accelerator | Accelerator (g) | Compressive strength after 6 h (MPa) | Mould |
|---|---|---|---|---|
| 6 (Comp.) | Ca formate (100%) | 4.50 | 2.2 | Styropor |
| 7 (Comp.) | Ca formate (100%) | 9.00 | 5.9 | Styropor |
| 8 (Comp.) | $Ca(NO_3)_2 \cdot 4\ H_2O$ | 1.63 | not measurable | Styropor |
| 9 (Comp.) | $Ca(NO_3)_2 \cdot 4\ H_2O$ | 3.24 | 1.8 | Styropor |
| 10 (Comp.) | $Ca(NO_3)_2 \cdot 4\ H_2O$ | 6.48 | 2.2 | Styropor |
| 11 (Comp.) | $Ca(NO_3)_2 \cdot 4\ H_2O$ | 12.95 | 4.4 | Styropor |
| 12 (Comp.) | Powder 0 (with PAA) | 6.82 | 7.4 | Styropor |
| 13 | Powder 2 (KP1) | 6.82 | 13.6 | Styropor |
| 14 | Powder 3 (KP2) | 6.82 | 15.2 | Styropor |
| 15 | Powder 4 (KP3) | 6.82 | 15.8 | Styropor |
| 16 | Powder 5 (KP4) | 6.82 | 13.9 | Styropor |
| 17 | Powder 6 (KP5) | 6.82 | 15.0 | Styropor |
| 18 | Powder 7 (KP6) | 6.82 | 14.7 | Styropor |
| 19 | Powder 8 (KP7) | 6.82 | 12.5 | Styropor |
| 20 | Powder 9 (KP8) | 6.82 | 12.4 | Styropor |
| 21 | Powder 10 (KP9: MVA® 2500) | 6.82 | 8.6 | Styropor |
| 22 (Comp.) | — | 0 | not measurable | Steel mould |
| 23 (Comp.) | X-Seed® 100 suspension | 31.34 | 9.7 | Steel mould |
| 24 | Powder 11 (KP2) | 6.82 | 9.1 | Steel mould |
| 25 | Powder 12 (KP2) | 6.82 | 8.7 | Steel mould |
| 26 | Powder 13 (KP2) | 6.82 | 8.3 | Steel mould |
| 27 | Powder 14 (KP2) | 6.82 | 7.7 | Steel mould |

In the mortar tests for pulverulent accelerators (Table 4), it can be seen, in particular, that even at very high added amounts of the comparative accelerators calcium formate and calcium nitrate it is not possible to even approximately achieve the high accelerator activities (early strengths) as the subject pulverulent products. The subject pulverulent products even achieve virtually the early strength of the liquid reference X-Seed® 100 (suspension), which indicates only very small decreases in the accelerator activity of X-Seed® 100 during drying. A relatively high charge density in the polycarboxylate ethers (cf., in particular, KP2, KP3, KP4 and KP5), in particular, has a favourable effect on the early strengths. These effects can be attributed to the surprisingly high stabilizing action exerted during drying of the polycarboxylate ethers added before the drying step. Polyacrylic acids, for example, which do not have appropriate polyether structural units (Comparative Example 12) do not display this effect. In addition, none of the comparative examples of Table 4, in particular not the Comparative Examples 4 to 11 (conventional accelerators based on calcium formate or calcium nitrate), are able to achieve similarly good final strengths (after 28 days) as the subject pulverulent accelerators.

The invention claimed is:

1. Process for producing solid, optionally pulverulent compositions containing calcium silicate hydrate comprising:
   a) mixing of an aqueous suspension containing preformed calcium silicate hydrate and optionally a comb polymer, with a drying aid comprising at least one water-soluble comb polymer which is suitable as plasticizer for hydraulic binders, and
   b) contemporaneously spray drying the mixture from step a).

2. Process according to claim 1, wherein the solid composition which can be obtained from the process has a weight ratio of the comb polymer or comb polymers to the calcium silicate hydrate of from 1/100 to 100/1.

3. Process according to claim 1, wherein the aqueous suspension containing calcium silicate hydrate used in process step a) has been obtained by reaction of a water-soluble calcium compound with a water-soluble silicate compound in the presence of an aqueous solution containing a water-soluble comb polymer which is suitable as plasticizer for hydraulic binders.

4. Process according to claim 1, wherein the aqueous suspension of calcium silicate hydrate used in process step a) has been obtained by reaction of a calcium compound, optionally a calcium salt and further optionally a water-soluble calcium salt, with a silicon dioxide-containing compound under alkaline conditions in the presence of an aqueous solution containing the water-soluble comb polymer which is suitable as plasticizer for hydraulic binders.

5. Process according to claim 1, wherein the aqueous suspension containing calcium silicate hydrate used in process step a) has been obtained by reaction of a water-soluble calcium compound with a water-soluble silicate compound in the presence of an aqueous solution of a (co)polymer having carboxylic acid groups and/or carboxylate groups and sulphonic acid groups and/or sulphonate groups, where the molar ratio of the number of carboxylic acid groups and/or carboxylate groups to the sulphonic acid groups and/or sulphonate groups in the (co)polymer is from 1/20 to 20/1.

6. Process according to claim 1, wherein the aqueous suspension of calcium silicate hydrate used in process step a) has been obtained by reaction of a calcium compound, optionally a calcium salt and further optionally a water-soluble calcium salt, with a silicon dioxide-containing compound under alkaline conditions in the presence of an aqueous solution of a (co)polymer having carboxylic acid groups and/or carboxylate groups and sulphonic acid groups and/or sulphonate groups, where the molar ratio of the number of carboxylic acid groups and/or carboxylate groups to the sulphonic acid groups and/or sulphonate groups in the (co)polymer is from 1/20 to 20/1.

7. Process according to claim 1, wherein the water-soluble comb polymer which is suitable as plasticizer for hydraulic binders which is used in process step a) is present as a copolymer containing ether functions, optionally in the form of polyalkylene glycols of the general formula $(AO)_n$, where the radicals A are, independently of one another, an alkylene having from 2 to 4 carbon atoms, O is oxygen and n is an integer from 2 to 350, and wherein the copolymer contains side chains having acid functions on the main chain.

8. Process according to claim 1, wherein the water-soluble comb polymer which is suitable as plasticizer for hydraulic binders which is used is present as a copolymer which has been produced by free-radical polymerization in the presence of acid monomers and polyether macromonomers in such a way that a total of at least 45 mol %, of all structural units of the copolymer have been produced by copolymerization of acid monomers and polyether macromonomers.

9. Process according to claim 8, wherein the free-radical copolymerization has given a copolymer having a structural unit which can be obtained by copolymerization of the acid monomer and corresponds to one of the general formulae (Ia), (Ib), (Ic) and/or (Id):

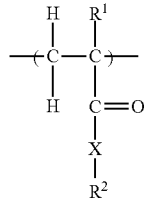
(Ia)

where
the radicals $R^1$ are identical or different and are each H and/or an unbranched or branched $C_1$-$C_4$ alkyl group;
the radicals X are identical or different and are each NH—$(C_nH_{2n})$ where n=1, 2, 3 or 4 or O—$(C_nH_{2n})$ where n=1, 2, 3 or 4 or an absent unit;
the radicals $R^2$ are identical or different and are each OH, $SO_3H$, $PO_3H_2$, O—$PO_3H_2$ or para-substituted $C_6H_4$—$SO_3H$, with the proviso that if X is an absent unit, $R^2$ is OH;

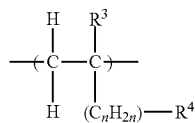
(Ib)

where
the radicals $R^3$ are identical or different and are each H or an unbranched or branched $C_1$-$C_4$ alkyl group;
n=, 1, 2, 3 or 4
the radicals $R^4$ are identical or different and are each $SO_3H$, $PO_3H_2$, O—$PO_3H_2$ or para-substituted $C_6H_4$—$SO_3H$;

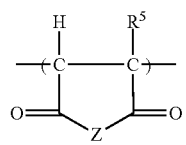
(Ic)

where
the radicals $R^5$ are identical or different and are each H or an unbranched or branched $C_1$-$C_4$ alkyl group;
the radicals Z are identical or different and are each O or NH;

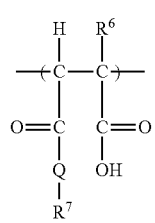
(Id)

where
the radicals $R^6$ are identical or different and are each H or an unbranched or branched $C_1$-$C_4$ alkyl group;
the radicals Q are identical or different and are each NH or O;
the radicals $R^7$ are identical or different and are each H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ or $(C_mH_{2m})_e$—O-$(A'O)_\alpha$—$R^9$ where m=0, 1, 2, 3 or 4, e=0, 1, 2, 3 or 4, $A'=C_{x'}H_{2x'}$ where x'=2, 3, 4 or 5 or $CH_2C(C_6H_5)H$—, $\alpha$=an integer from 1 to 350 and the radicals $R^9$ are identical or different and are each an unbranched or branched $C_1$-$C_4$ alkyl group.

10. Process according to claim 8, wherein the free-radical copolymerization has given a copolymer containing a structural unit which can be obtained by copolymerization of the polyether macromonomer and corresponds to one of the general formulae (IIa), (IIb), (IIc) and/or (IId):

$$\begin{array}{c} R^{10} \ R^{11} \\ | \ | \\ -\!\!\!-\!\!(C\!-\!C)\!-\!\!\!- \\ | \ | \\ R^{12} \ (C_nH_{2n})\!-\!O\!-\!E\!-\!G\!-\!(AO)_a\!-\!R^{13} \end{array}$$ (IIa)

where
$R^{10}$, $R^{11}$ and $R^{12}$ are identical or different and are each, independently of one another, H or an unbranched or branched $C_1$-$C_4$ alkyl group;
the radicals E are identical or different and are each an unbranched or branched $C_1$-$C_6$ alkylene group, a cyclohexyl group, $CH_2$—$C_6H_{10}$, ortho-substituted $C_6H_4$, meta-substituted $C_6H_4$ or para-substituted $C_6H_4$ or an absent unit;
the radicals G are identical or different and are each O, NH or CO—NH, with the proviso that if E is an absent unit, G is also an absent unit;
the radicals A are identical or different and are each $C_xH_{2x}$ where x=2, 3, 4 or 5 or $CH_2CH(C_6H_5)$;
the indices n are identical or different and are each 0, 1, 2, 3, 4 or 5;
the indices a are identical or different and are each an integer from 2 to 350;
the radicals $R^{13}$ are identical or different and are each H, an unbranched or branched $C_1$-$C_4$ alkyl group, CO—$NH_2$ or $COCH_3$;

$$\begin{array}{c} D \\ / \ \backslash \\ (CH_2)_b \ (CH_2)_c \\ \backslash \ / \\ -\!\!\!-\!\!(C\!-\!C)\!-\!\!\!- \\ | \ | \\ R^{14} \ (C_nH_{2n})\!-\!O\!-\!E\!-\!G\!-\!(AO)_a\!-\!R^{15} \end{array}$$ (IIb)

where
the radicals $R^{14}$ are identical or different and are each H or an unbranched or branched $C_1$-$C_4$ alkyl group;
the radicals E are identical or different and are each an unbranched or branched $C_1$-$C_6$ alkylene group, a cyclohexyl group, $CH_2$—$C_6H_{10}$, ortho-substituted $C_6H_4$, meta-substituted $C_6H_4$ or para-substituted $C_6H_4$ or an absent unit;

the radicals G are identical or different and are each an absent unit, O, NH or CO—NH, with the proviso that if E is an absent unit, G is also an absent unit;

the radicals A are identical or different and are each $C_xH_{2x}$ where x=2, 3, 4 or 5 or $CH_2CH(C_6H_5)$;

the indices n are identical or different and are each 0, 1, 2, 3, 4 or 5;

the indices a are identical or different and are each an integer from 2 to 350;

the radicals D are identical or different and are each an absent unit, NH or O, with the proviso that if D is an absent unit: b=0, 1, 2, 3 or 4 and c=0, 1, 2, 3 or 4, where b+c=3 or 4, and with the proviso that when D is NH or O: b=0, 1, 2 or 3, c=0, 1, 2 or 3, where b+c=2 or 3;

the radicals $R^{15}$ are identical or different and are each H, an unbranched or branched $C_1$-$C_4$ alkyl group, CO—$NH_2$ or $COCH_3$;

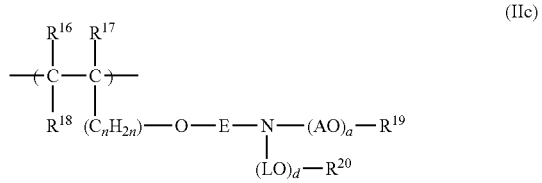

(IIc)

where $R^{16}$, $R^{17}$ and $R^{18}$ are identical or different and are each, independently of one another, H or an unbranched or branched $C_1$-$C_4$ alkyl group;

the radicals E are identical or different and are each an unbranched or branched $C_1$-$C_6$ alkylene group, a cyclohexyl group, $CH_2$—$C_6H_{10}$, ortho-substituted $C_6H_4$, meta-substituted $C_6H_4$ or para-substituted $C_6H_4$ or an absent unit;

the radicals A are identical or different and are each $C_xH_{2x}$ where x=2, 3, 4 or 5 $CH_2$—$CH(C_6H_5)$;

the indices n are identical or different and are each 0, 1, 2, 3, 4 or 5;

the radicals L are identical or different and are each $C_xH_{2x}$ where x=2, 3, 4 or 5 or $CH_2$—$CH(C_6H_5)$;

the indices a are identical or different and are each an integer from 2 to 350;

the indices d are identical or different and are each an integer from 1 to 350;

the radicals $R^{19}$ are identical or different and are each H and/or an unbranched or branched $C_1$-$C_4$ alkyl group, the radicals $R^{20}$ are identical or different and are each H or an unbranched $C_1$-$C_4$ alkyl group;

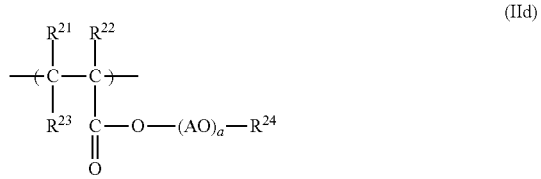

(IId)

where $R^{21}$, $R^{22}$ and $R^{23}$ are identical or different and are each, independently of one another, H or an unbranched or branched $C_1$-$C_4$ alkyl group;

the radicals A are identical or different and are each $C_xH_{2x}$ where x=2, 3, 4 or 5 or $CH_2CH(C_6H_5)$;

the indices a are identical or different and are each an integer from 2 to 350;

the radicals $R^{24}$ are identical or different and are each H or an unbranched or branched $C_1$-$C_4$ alkyl radical.

11. Process according to claim 1, wherein the water-soluble comb polymer which is suitable as plasticizer for hydraulic binders and is used in process step a) has an average ratio of the number of moles of carboxyl and/or carboxylate groups to the total molar mass of the comb polymer of from 1/200 to 1/1500 mol/(g/mol).

12. Compositions comprising calcium silicate hydrate, obtained by:
a) mixing of an aqueous suspension containing preformed calcium silicate hydrate and optionally a comb polymer, with a drying aid comprising at least one water-soluble comb polymer which is suitable as plasticizer for hydraulic binders, and
b) contemporaneously spray drying the mixture from step a).

13. Building material mixtures containing compositions according to claim 12 and cement, slag sand, fly ash, silica dust, metakaolin, natural pozzolanas, calcined oil shales and/or calcium aluminate cement, optionally portland cement and binders based on calcium sulphate, or further optionally portland cement, as binder.

14. The composition according to claim 12, wherein the aqueous suspension containing calcium silicate hydrate has been obtained by reaction of a water-soluble calcium compound with a water-soluble silicate compound in the presence of an aqueous solution of a (co)polymer having carboxylic acid groups and/or carboxylate groups and sulphonic acid groups and/or sulphonate groups, where the molar ratio of the number of carboxylic acid groups and/or carboxylate groups to the sulphonic acid groups and/or sulphonate groups in the (co)polymer is from 1/20 to 20/1.

15. The composition according to claim 12, wherein the aqueous suspension of calcium silicate hydrate has been obtained by reaction of a calcium compound, optionally a calcium salt and further optionally a water-soluble calcium salt, with a silicon dioxide-containing compound under alkaline conditions in the presence of an aqueous solution of a (co)polymer having carboxylic acid groups and/or carboxylate groups and sulphonic acid groups and/or sulphonate groups, where the molar ratio of the number of carboxylic acid groups and/or carboxylate groups to the sulphonic acid groups and/or sulphonate groups in the (co)polymer is from 1/20 to 20/1.

16. The composition according to claim 12, wherein the water-soluble comb polymer which is suitable as plasticizer for hydraulic binders is present as a copolymer containing ether functions, optionally in the form of polyalkylene glycols of the general formula $(AO)_n$, where the radicals A are, independently of one another, an alkylene having from 2 to 4 carbon atoms, O is oxygen and n is an integer from 2 to 350, and wherein the copolymer contains side chains having acid functions on the main chain.

17. The composition according to claim 12, wherein the water-soluble comb polymer which is suitable as plasticizer for hydraulic binders which is used is present as a copolymer which has been produced by free-radical polymerization in the presence of acid monomers and polyether macromonomers in such a way that a total of at least 45 mol %, of all structural units of the copolymer have been produced by copolymerization of acid monomers and polyether macromonomers.

18. The composition according to claim 17, wherein the free-radical copolymerization has given a copolymer having a structural unit which can be obtained by copolymerization of the acid monomer and corresponds to one of the general formulae (Ia), (Ib), (Ic) and/or (Id):

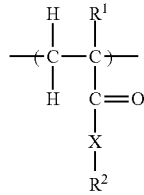
(Ia)

where
the radicals $R^1$ are identical or different and are each H and/or an unbranched or branched $C_1$-$C_4$ alkyl group;
the radicals X are identical or different and are each NH—$(C_nH_{2n})$ where n=1, 2, 3 or 4 or O—$(C_nH_{2n})$ where n=1, 2, 3 or 4 or an absent unit;
the radicals $R^2$ are identical or different and are each OH, $SO_3H$, $PO_3H_2$, O—$PO_3H_2$ or para-substituted $C_6H_4$—$SO_3H$, with the proviso that if X is an absent unit, $R^2$ is OH;

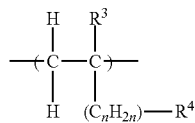
(Ib)

where
the radicals $R^3$ are identical or different and are each H or an unbranched or branched $C_1$-$C_4$ alkyl group;
n=0, 1, 2, 3 or 4
the radicals $R^4$ are identical or different and are each $SO_3H$, $PO_3H_2$, O—$PO_3H_2$ or para-substituted $C_6H_4$—$SO_3H$;

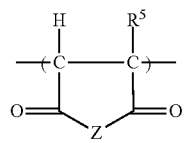
(Ic)

where
the radicals $R^5$ are identical or different and are each H or an unbranched or branched $C_1$-$C_4$ alkyl group;
the radicals Z are identical or different and are each O or NH;

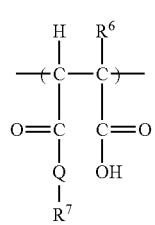
(Id)

where
the radicals $R^6$ are identical or different and are each H or an unbranched or branched $C_1$-$C_4$ alkyl group;
the radicals Q are identical or different and are each NH or O;
the radicals $R^7$ are identical or different and are each H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ or $(C_mH_{2m})_e$—O—$(A'O)_\alpha$—$R^9$ where m=0, 1, 2, 3 or 4, e=0, 1, 2, 3 or 4, $A'=C_{x'}H_{2x'}$ where x'=2, 3, 4 or 5 or $CH_2C(C_6H_5)H$—, $\alpha$=an integer from 1 to 350 and the radicals $R^9$ are identical or different and are each an unbranched or branched $C_1$-$C_4$ alkyl group.

19. The composition according to claim 17, wherein the free-radical copolymerization has given a copolymer containing a structural unit which can be obtained by copolymerization of the polyether macromonomer and corresponds to one of the general formulae (IIa), (IIb), (IIc) and/or (IId):

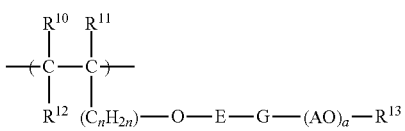
(IIa)

where
$R^{10}$, $R^{11}$ and $R^{12}$ are identical or different and are each, independently of one another, H or an unbranched or branched $C_1$-$C_4$ alkyl group;
the radicals E are identical or different and are each an unbranched or branched $C_1$-$C_6$ alkylene group, a cyclohexyl group, $CH_2$—$C_6H_{10}$, ortho-substituted $C_6H_4$, meta-substituted $C_6H_4$ or para-substituted $C_6H_4$ or an absent unit;
the radicals G are identical or different and are each O, NH or CO—NH, with the proviso that if E is an absent unit, G is also an absent unit;
the radicals A are identical or different and are each $C_xH_{2x}$ where x=2, 3, 4 or 5 or $CH_2CH(C_6H_5)$;
the indices n are identical or different and are each 0, 1, 2, 3, 4 or 5;
the indices a are identical or different and are each an integer from 2 to 350;
the radicals $R^{13}$ are identical or different and are each H, an unbranched or branched $C_1$-$C_4$ alkyl group, CO—$NH_2$ or $COCH_3$;

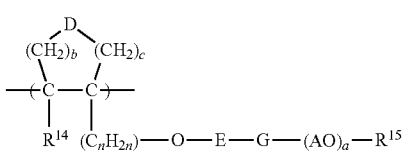
(IIb)

where
the radicals $R^{14}$ are identical or different and are each H or an unbranched or branched $C_1$-$C_4$ alkyl group;
the radicals E are identical or different and are each an unbranched or branched $C_1$-$C_6$ alkylene group, a cyclohexyl group, $CH_2$—$C_6H_{10}$, ortho-substituted $C_6H_4$, meta-substituted $C_6H_4$ or para-substituted $C_6H_4$ or an absent unit;

the radicals G are identical or different and are each an absent unit, O, NH or CO—NH, with the proviso that if E is an absent unit, G is also an absent unit;

the radicals A are identical or different and are each $C_xH_{2x}$ where x=2, 3, 4 or 5 or $CH_2CH(C_6H_5)$;

the indices n are identical or different and are each 0, 1, 2, 3, 4 or 5;

the indices a are identical or different and are each an integer from 2 to 350;

the radicals D are identical or different and are each an absent unit, NH or O, with the proviso that if D is an absent unit: b=0, 1, 2, 3 or 4 and c=0, 1, 2, 3 or 4, where b+c=3 or 4, and with the proviso that when D is NH or O: b=0, 1, 2 or 3, c=0, 1, 2 or 3, where b+c=2 or 3;

the radicals $R^{15}$ are identical or different and are each H, an unbranched or branched $C_1$-$C_4$ alkyl group, CO—$NH_2$ or $COCH_3$;

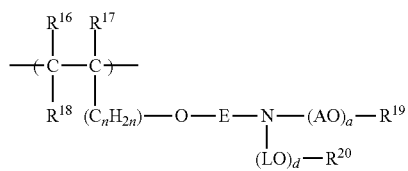

(IIc)

where $R^{16}$, $R^{17}$ and $R^{18}$ are identical or different and are each, independently of one another, H or an unbranched or branched $C_1$-$C_4$ alkyl group;

the radicals E are identical or different and are each an unbranched or branched $C_1$-$C_6$ alkylene group, a cyclohexyl group, $CH_2$—$C_6H_{10}$, ortho-substituted $C_6H_4$, meta-substituted $C_6H_4$ or para-substituted $C_6H_4$ or an absent unit;

the radicals A are identical or different and are each $C_xH_{2x}$ where x=2, 3, 4 or 5 $CH_2$—$CH(C_6H_5)$;

the indices n are identical or different and are each 0, 1, 2, 3, 4 or 5;

the radicals L are identical or different and are each $C_xH_{2x}$ where x=2, 3, 4 or 5 or $CH_2$—$CH(C_6H_5)$;

the indices a are identical or different and are each an integer from 2 to 350;

the indices d are identical or different and are each an integer from 1 to 350;

the radicals $R^{19}$ are identical or different and are each H and/or an unbranched or branched $C_1$-$C_4$ alkyl group, the radicals $R^{20}$ are identical or different and are each H or an unbranched $C_1$-$C_4$ alkyl group;

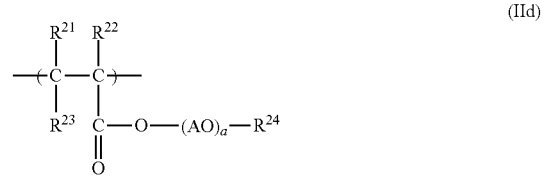

(IId)

where $R^{21}$, $R^{22}$ and $R^{23}$ are identical or different and are each, independently of one another, H or an unbranched or branched $C_1$-$C_4$ alkyl group;

the radicals A are identical or different and are each $C_xH_{2x}$ where x=2, 3, 4 or 5 or $CH_2CH(C_6H_5)$;

the indices a are identical or different and are each an integer from 2 to 350;

the radicals $R^{24}$ are identical or different and are each H or an unbranched or branched $C_1$-$C_4$ alkyl radical.

20. The composition according to claim 12, wherein the water-soluble comb polymer which is suitable as plasticizer for hydraulic binders is present as a copolymer containing ether functions, optionally in the form of polyalkylene glycols of the general formula $(AO)_n$, where the radicals A are, independently of one another, an alkylene having from 2 to 4 carbon atoms, O is oxygen and n is an integer from 10 to 200, and wherein the copolymer contains side chains having acid functions on the main chain.

21. Process of using the composition according to claim 12 as a curing accelerator in building material mixtures containing cement, slag sand, fly ash, silica dust, metakaolin, natural pozzolanas, calcined oil shales and/or calcium aluminate cement, optionally containing portland cement and binders based on calcium sulphate, or further optionally portland cement as binder, comprising mixing the curing accelerator with the cement, slag sand, fly ash, silica dust, metakaolin, natural pozzolanas, calcined oil shales and/or calcium aluminate cement, and water.

22. Process of using the composition according to claim 12 as a grinding aid in the production of cement comprising mixing the composition with clinker or clinker blend before or during grinding of the clinker or clinker blend.

* * * * *